(12) United States Patent
Sato et al.

(10) Patent No.: US 6,185,113 B1
(45) Date of Patent: Feb. 6, 2001

(54) TRANSFORMER AND SWITCHING REGULATOR THAT PREVENTS WINDING'S CAUSED BY MAGNETIC FIELD LEAKAGE

(75) Inventors: Yuichi Sato; Tokio Muta; Kazuo Shimada, all of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/428,541

(22) Filed: Oct. 28, 1999

(30) Foreign Application Priority Data

Apr. 15, 1999 (JP) .................................................. 11-108536

(51) Int. Cl.⁷ .................................................. H02M 3/335
(52) U.S. Cl. .................................................. 363/19
(58) Field of Search .................. 363/178, 19, 18

(56) References Cited

U.S. PATENT DOCUMENTS

| | | | |
|---|---|---|---|
| 4,757,433 | * | 7/1988 | Santelmann, Jr. ...................... 363/19 |
| 6,043,994 | * | 3/2000 | Keller ..................................... 363/19 |

* cited by examiner

*Primary Examiner*—Shawn Riley
(74) *Attorney, Agent, or Firm*—Armstrong, Westerman, Hattori, McLeland & Naughton

(57) ABSTRACT

A transformer and switching regulator that prevents winding's breakdown caused by the leakage magnetic field. A transformer has a core having an air gap, and a winding wound around the core. The turn density of the winding is made least on the air gap. The switching regulator has such a transformer.

9 Claims, 4 Drawing Sheets

TRANSFORMER AND SWITCHING REGULATOR THAT PREVENTS WINDING'S CAUSED BY MAGNETIC FIELD LEAKAGE

BACKGROUND OF THE INVENTION

The present invention generally relates to transformers, and more particularly to a winding structure for a transformer. The present invention is suitable, for example, for a transformer for use with self-excited (or self-oscillating) switching converters, such as a ringing chalk converter (RCC).

An RCC is known as a typical on/off switching regulator. The switching regulator is a circuit that efficiently regulates a power flow by controlling a time ratio between switching on and off in transistor(s). The on/off type means that a rectifier diode turns off while a switching transistor turns on in a switching regulator. The on/off type transistor stores energy in transformer's primary winding while the transistor turns on, and releases the stored energy to an output side (i.e., a load) via a rectifier diode from transformer's secondary winding while the transformer turns off. The on/off switching regulator is divided into two types; a separately excited type that is activated by an external oscillator, and a self-excited type that switches without an aid of an external oscillator. The latter type is generally referred to as an RCC.

The RCC needs to determine an oscillation frequency and time ratio in order to stabilize an output voltage, and therefore design a transformer considering various parameters including inductance values for primary and secondary windings. Experimentally speaking, an actual transformer that is designed in accordance with conventional theoretic equations would not completely conform to these equations. As a consequence, an attempt to obtain a desired output voltage using a transformer that is designed in accordance with the theoretic equations would cause a transistor to flow infinite collector current Ic over its rated road in a split second due to the excessive low oscillation frequency, possibly breaking down the transistor (while this phenomenon is known as "magnetic saturation"). The actually used transformer used to form an air gap having a gap length of a necessary distance in order to reduce the inductance down to a necessary value by lowering core's effective magnetic permeability. The air gap means core's gap formed at a center pole.

However, the air gap portion has no core connection, and thus causes a leakage magnetic field. The leakage magnetic field might generate, when crossing with a winding, heat in the winding. In particular, a winding having a high turn density (i.e., cohesive turning) has the increased number of turns that cross with the leakage magnetic field, and generates a large amount of heat. The heat increasing the temperature in the power source unit lowers components' reliability, and causing a problem, such as shortening a life of an electrolysis capacitor or another component. The winding generally uses an enamel line that has an upper limit on heatproof temperature, and heat that exceeds the upper limit would disadvantageously break the isolative coat and cause rare short.

SUMMARY OF THE INVENTION

Therefore, it is an exemplified general object of the present invention to provide a novel and useful transformer and switching regulator in which the above disadvantages are eliminated.

Another exemplified and more specific object of the present invention is to provide a transformer and switching regulator that improves reliability of a power-supply unit component and prevents winding's breakdown by preventing the temperature rise in the winding caused by the leakage magnetic field.

In order to achieve the above objects, a transformer of one aspect of the present invention comprises a core having an air gap, and a winding wound around the core, a turn density of the winding being made least on the air gap.

A core for use with a transformer of one aspect of the present invention comprises a first core member, and a second core member coupled to the first core member, an air gap formed between the first and second core member being offset from a center of the core.

A switching regulator of one aspect of the present invention comprises a switch, a transformer, connected to the switch, which comprises a core having an air gap, and a winding wound around the core, a turn density of the winding being made least on the air gap, and a rectifier connected to the transformer.

A transformer manufacturing method of one aspect of the present invention comprises the steps of forming a core having an air gap by connecting first and second core member to each other, connecting said core to a bobbin, and forming a winding on said bobbin so that a turn density becomes least on the air gap.

A transformer of the present invention has the least turn density on the air gap where the leakage magnetic field becomes the largest, and thus has the minimum calorific value resulted from the leakage magnetic field. The switching regulator having this transformer has the same effects. The manufacturing method of the transformer of one aspect of the present invention facilitates manufacturing of a transformer. The core of one aspect of the present invention facilitates manufacturing of a transformer by forming an air gap at the edge of the core.

Other objects and further features of the present invention will become readily apparent from the following description of the embodiments with reference to accompanying drawings.

DETAILED DESCRIPTION OF PREFERRED EMBODIMENTS

Figure 1:
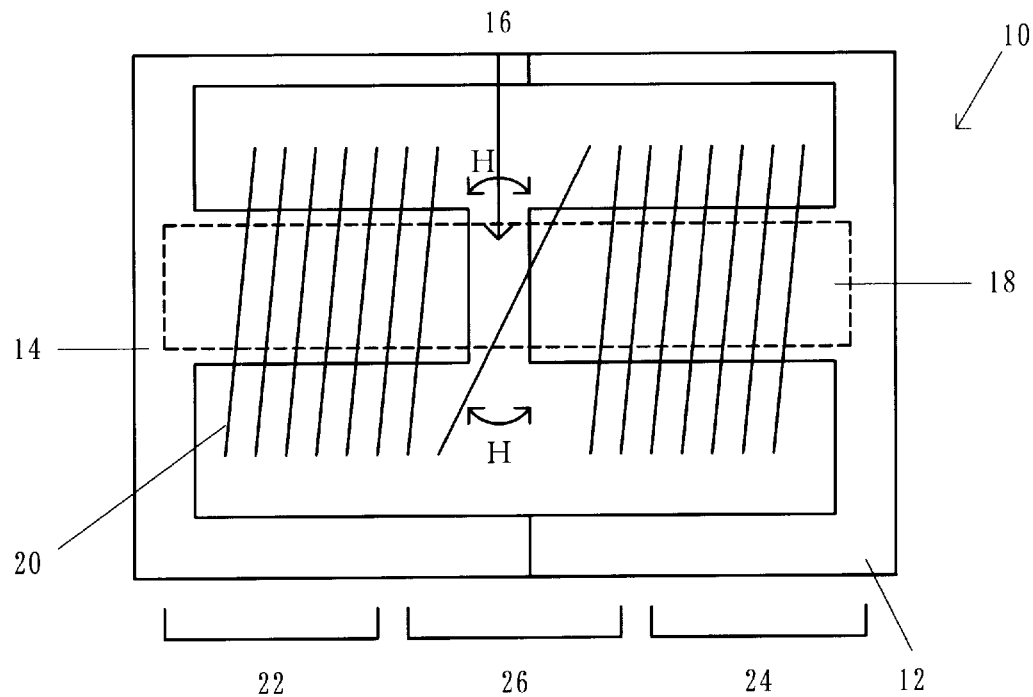
FIG. 1 is a schematic enlarged view of an EE core of a first embodiment according to the present invention.
Figure 2:
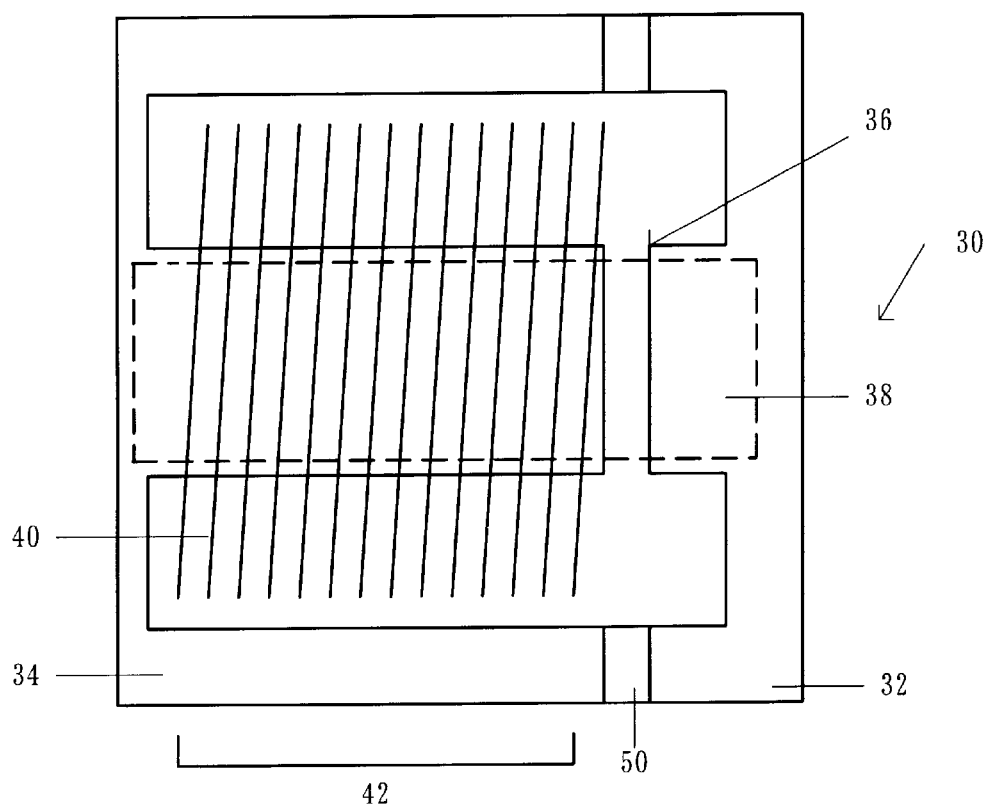
FIG. 2 is a schematic enlarged view of an EE core of a second embodiment according to the present invention.
Figure 3:
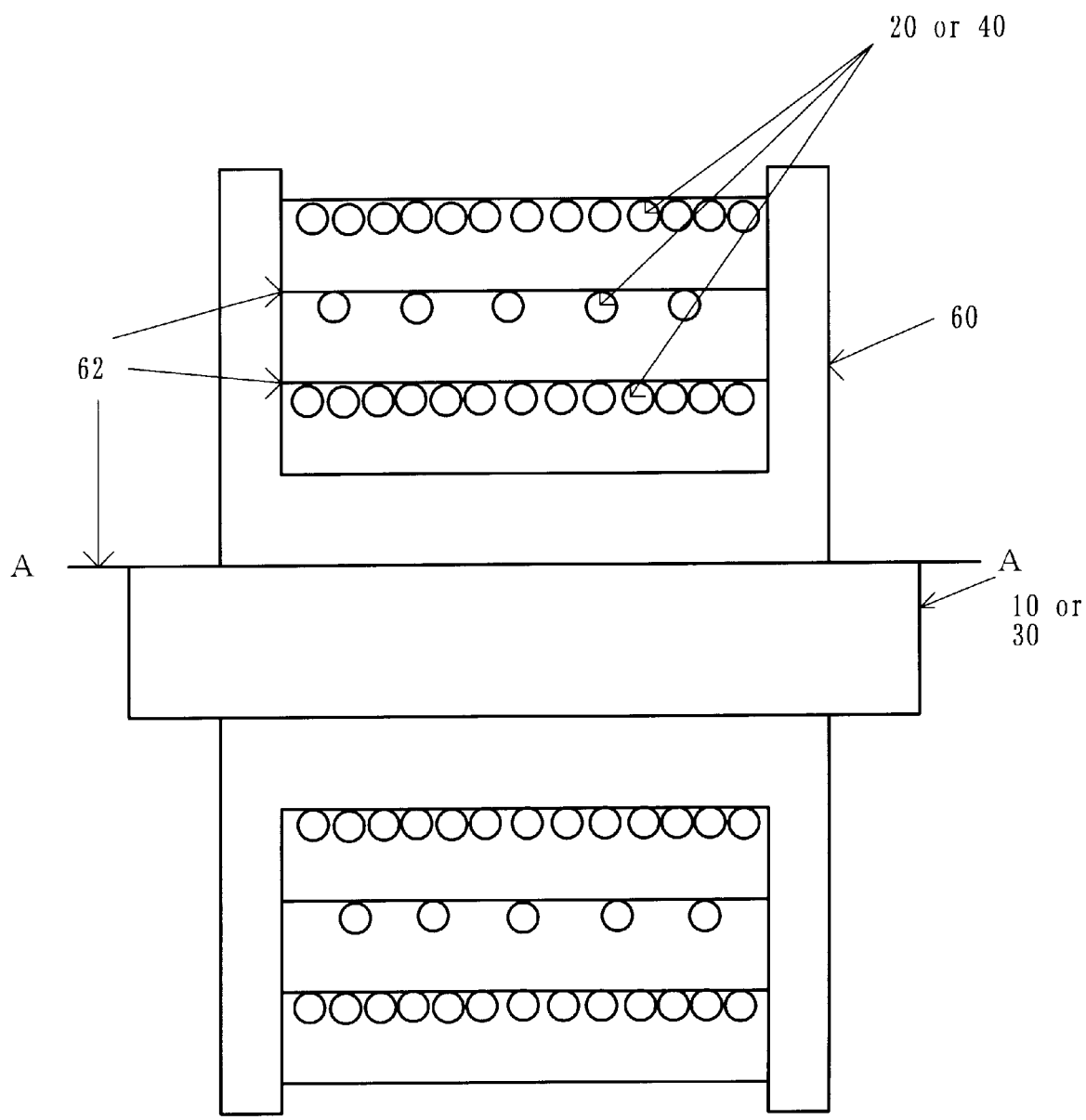
FIG. 3 is a sectional view of a transformer to which the EE cores of the first and second embodiments are applicable.

A description will now be give of transformer of one aspect of the present invention, with reference to FIGS. 1–3. FIG. 1 is a schematic enlarged view of EE core 10 of a first embodiment. FIG. 2 is a schematic enlarged view of EE core 30 of a second embodiment. FIG. 3 is a sectional view of a transformer to which the EE cores 10 and 30 are applicable. FIGS. 1 and 2 respectively correspond to a section taken along line A—A shown in FIG. 3 viewed from an arrow direction.

Referring to FIG. 1, the EE core 10 includes first core member 12, second core member 14, air gap 16, and winding 20. The first and second core members 12 and 14 are molded so that they have the same E shape. The molding method of the first and second core members 12 and 14 may use any method known in the art, and a description thereof will be omitted. Next, one of the core members (for example, the first core member 12) is abraded to reduce the number of steps. The first and second core members 12 and 14 are then coupled, and an air gap is formed between them. Optionally, both the first and second core members 12 and 14 are abraded.

The air gap is formed at center pole 18 (that is a portion enclosed by dotted line in FIG. 1). The air gap 16 is located at the center of the EE core 10. For example, the air gap 16 that is formed by abrading only the first core member 12 may be offset from the center of the EE core 10, strictly speaking, but is considered to be at the center of the EE core 10 in this application. The air gap 16 is formed at the center when the first and second core members 12 and 14 have the same width. The leakage magnetic field H is generated at the air gap 16 since the first and second core members 12 and 14 are not connected.

The winding 20, which is made of enamel line, for example, is densely turned around edge 22 of the first core member 12 and edge 24 of the second core member 14, while it is coarsely turned around the center portion 26. The center portion 26 includes a perimeter of the air gap 16, but preferably covers an area that is greatly influenced by the magnetic field H leaked from the air gap 16. The area that is greatly influenced by the magnetic field H leaked from the air gap 16 depends upon the size of the core 10, the strength of the magnetic field H, winding 20's heatproof characteristic, etc. The EE core 10 of this embodiment has the least turn density on the air gap 16 (and its vicinity). The reduced number of turns in the winding 20 that cross the leakage magnetic field lowers a calorific value, preventing transformer's temperature rise.

Referring to FIG. 2, the EE core 30 has first core member 32, second core member 34, and air gap 36, and is would by winding 40. The first and second core members 32 and 34 both have an E shape, but its shape and size are not completely the same. This embodiment inserted spacer 50 as an insulator instead of abrading one or both of the core members. One or both of the core members may be abraded as with the core 10 in the first embodiment.

The air gap 36 is formed at the center pole 38 (that is a portion enclosed by dotted line). In this embodiment, the air gap 36 is not formed at but offset from the center of the EE core 30. An offset of the air gap 36 is selected so that the winding 40 that will be described later may be formed at portion 42 by the predetermined number of turns. As described later, the number of turns and the gap length around the transformer 100 are determined in advance. For example, even when the winding 20 is turned around the portion 22 (and its vicinity) in FIG. 1, the number 20 at the air gap 16 and the second core member 14 cannot be omitted if it does not reach the predetermined number of turns.

The winding 40 is densely turned with a uniform density at the portion 42 of the first core member 34, but not would around the air gap 36. Therefore, the turn density on the air gap 36 is zero. The reduced number of turns of the winding 40 that cross the leakage magnetic field lowers a calorific value, thereby preventing the temperature rise in the winding 40.

The transformer 100 is formed, for example, by forming core 10 or 30 having air gaps 16 or 36 by coupling with each other the first and second core members 12 and 14 or 32 and 34, then turning winding 20 or 40 around bobbin 60 so that the turn density becomes minimum on the air gap 16 or 36, and then connecting the core 10 or 30 to the bobbin 60. In order to turn the winding 20 around the bobbin 60 by changing the turn density, any method known in the art may be employed. For example, one edge of the bobbin 60 or another point is made to be a reference point, and the turn density of the winding 20 may be controlled in accordance with a distance from the reference point. Those skilled in the art would make such a control program based on the disclosure of the instant application, and a description thereof will be omitted. When this method is applied to the core 30 and the winding 40, only a distance from the reference point may be controlled without changing the turn density.

Figure 4:
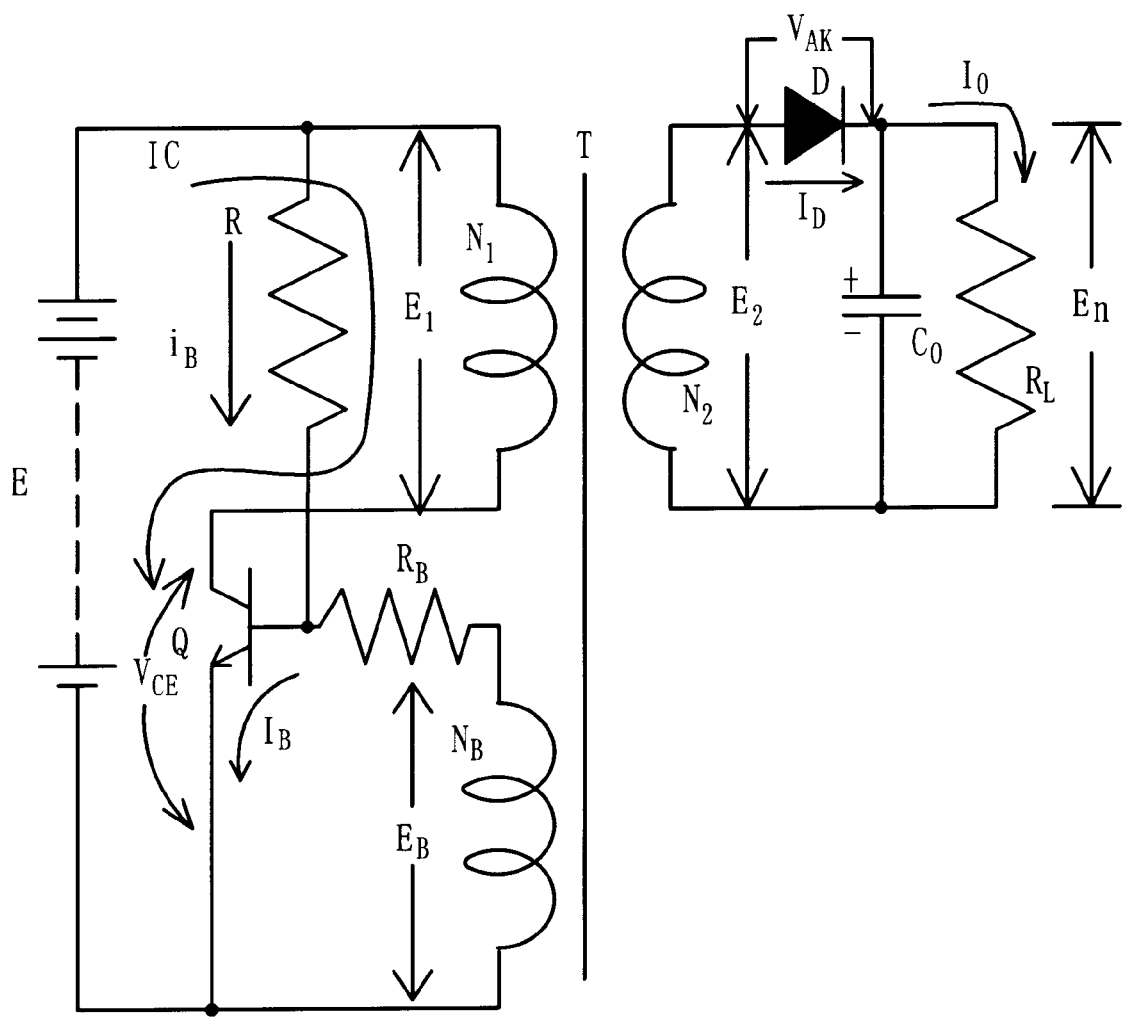
FIG. 4 is a principal view of a ringing chalk converter (RCC) to which the transformer shown in FIG. 3 is applicable.
Figure 5:
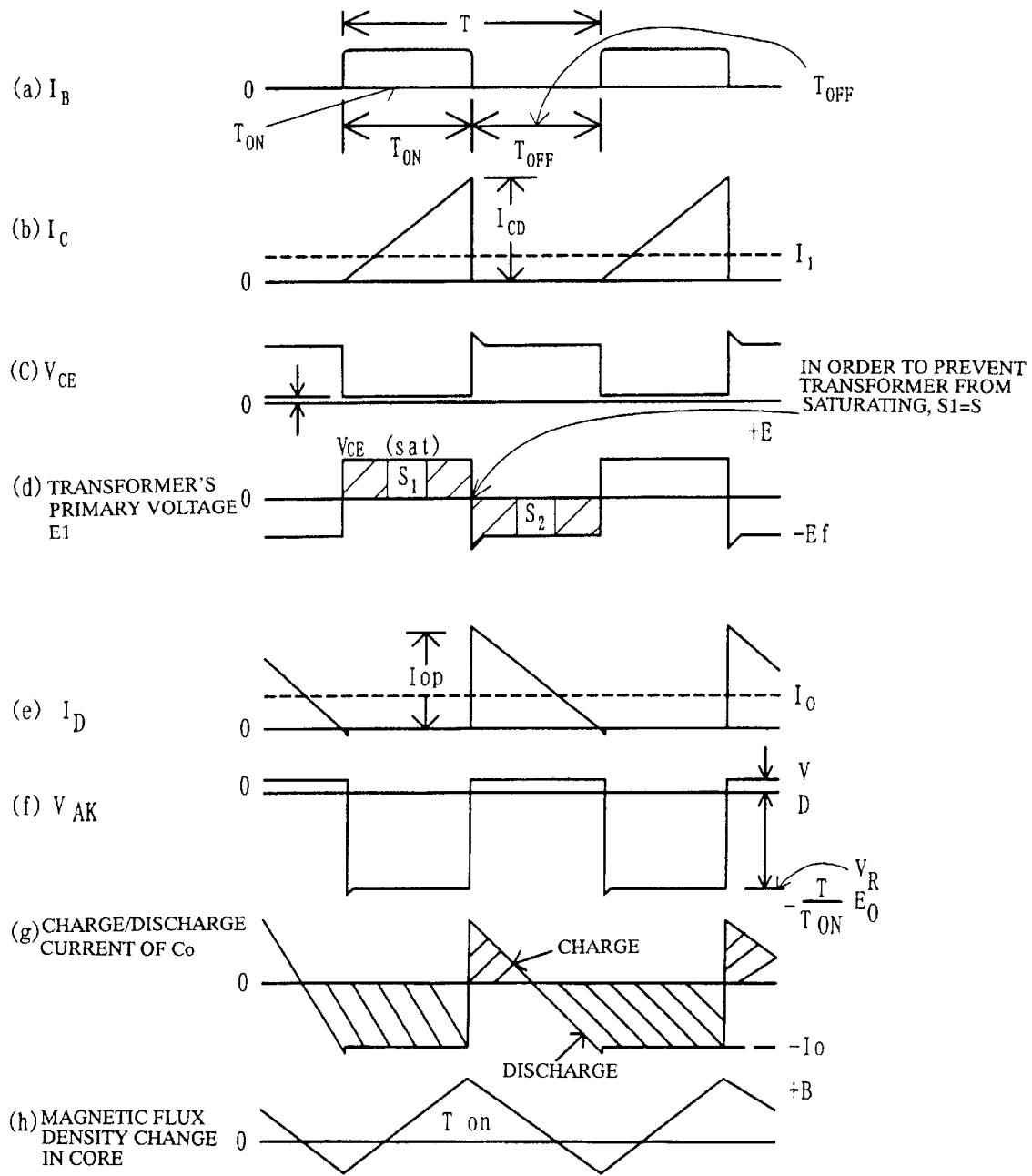
FIG. 5 is an operational waveform chart of each component in the RCC shown in FIG. 4.

Next follows a description of ringing chalk converter (RCC) 200 as an exemplified self-excited on/off switching regulator having the transformer 100 of the present invention, with reference to FIGS. 4 and 5. FIG. 4 is a principal view of RCC 200, and FIG. 5 is an operational waveform of each component.

The RCC 200 is connected to input DC voltage E, and includes transistor Q as a switch, transformer 100, and rectifier diode D. This transformer has winding start mark " ", and characteristically the primary winding and the secondary winding have different polarities. The DC voltage E may be generated from AC. The RCC 200 generates a rectangular wave voltage to the secondary side of the transformer 100 by making the transistor Q repeat on/off oscillation at a certain period, and then converts the voltage into the DC voltage.

The transformer 100 stores, while the transistor Q turns on, energy in the primary winding inductance $L_1$, and supplies, while the transistor Q turns off, this energy to smoothing capacitor $C_0$ and load $R_L$ via the rectifier diode D. The transistor Q turns on when current $i_B$ flows through start resistor R with the input voltage E, thereby magnetizing the primary winding $N_1$ in the transformer 100. A small amount of collector current Ic flows, as the transistor Q is positively biased by voltage that is slightly evoked at bias winding $N_B$. In addition, voltage $E_B$ that is evoked at the bias winding $N_B$ increases. This tendency is promoted, switching the transistor to the ON state in a leap. Then, certain constant voltage $E_1=E-V_{CE}$ that is almost equal to the input voltage E is generated in the primary winding in the transformer 100, whereby the collector current Ic in the transistor Q increases from 0 directly.

The transistor Q saturates at a certain point, and transfers to the OFF state since there is no bias power necessary to drive the larger current. The primary voltage is reversed in the transformer 100.

When the transistor turns on and increases Ic and $V_{CE}$, a certain point (i.e., Ic $I_B$ $h_{FE}$) appears where an increase of $V_{BE}$ is required to maintain an increase of Ic, and constant $V_{BE}$ decreases $I_B$. This tendency is promoted and the transistor Q turns off in an instant.

Subsequently, the secondary winding with a reverse polarity makes current flow through the rectifier diode D in a forward bias direction, extinguishing the reverse bias power source for the transistor Q after the power is supplied to the secondary output. The transistor Q again switches to the ON state by the feedback reproduction action, and repeats this state for a certain period.

A description will be given of basic theoretic equations necessary for the conventional transformer design. The primary inductance $L_1$, the number of turns $N_1$ and the core gap lg in the transformer 100 are give by the following equation. The core gap is designed to lower core's effective magnetic permeability and reduce the inductance to the necessary value.

$$L_1 = \frac{E_1 \cdot T_{ON}}{I_{cp}} \quad \text{Equation 1}$$

$$N_1 = \frac{L_1 \cdot I_{cp}}{S \cdot B_m} \times 10^8 = \frac{E_1 \cdot T_{ON}}{S \cdot B_m} \times 10^8$$

$$lg = 4\pi \times 10^{-8} \cdot \frac{S(N_1)^2}{L_1}$$

Here, $L_1$ is a primary inductance (H) in the transformer 100, $T_{ON}$ is an ON period (s) in the transistor Q, S is core's effective sectional area (cm²), lg is a length of the air gap 16 or 36 (mm), and $B_m$ is core's largest magnetic flux density (G).

The effective magnetic permeability $\mu_e$ may be defined as a magnetic permeability as defined by the following equation using the effective self-inductance in a core in a closed magnetic circuit in which the leakage magnetic flux is ignorable.

$$\mu_e = \frac{L \times 10^9}{4\pi N^2} \cdot \sum \frac{l}{A} \quad \text{Equation 2}$$

Or $$\mu_e = \sum \frac{l}{A} \bigg/ \sum \frac{l}{\mu A}$$

Here, L is an effective inductance (H), N is the total number of turns, l is a magnetic path length (cm) for the same material and sectional area, A is a sectional area (cm²), and $\mu$ is the magnetic permeability of the material. The former equation may be used for calculation for measurement purposes, while the latter equation may be used to calculate a core component size and magnetic permeability.

In order to prevent the core in the transformer 100 from saturating, the magnetic-flux changing amount should be zero during one period. Where $E_f$ is flyback voltage (reverse voltage) that is generated at the primary winding when the transistor Q turns off, the following equation is given.

$$E_1 \cdot T_{ON} = E_f \cdot T_{OFF} \quad \text{Equation 3}$$

$$E_f = \frac{N_1}{N_2} E_2$$

$$E_2 = E_0 + V_D$$

Thereby, the number of turns $N_2$ of the secondary winding and the number of turns $N_B$ of the bias winding in the transformer 100 becomes as follows:

$$N_2 = N_1 \frac{E_0}{E_1} \cdot \frac{T_{OFF}}{T_{ON}} (1 + \varepsilon) \quad \text{Equation 4}$$

$$N_B = \frac{E_B}{E_1} N_1$$

Here, $E_0$ is output voltage (V), $V_D$ is forward descend voltage (V), and $\varepsilon$ is a voltage regulation in the transformer 100. Experimentally speaking, an actual transformer that is designed in accordance with these conventional theoretic equations would not completely conform to these equations. As a consequence, an attempt to obtain a desired output voltage using a transformer that is designed in accordance with the theoretic equations would cause a transistor to flow infinite collector current Ic over its rated road in a split second due to the excessive low oscillation frequency, possibly breaking down the transistor ("magnetic saturation"). Accordingly, the transformer 100 of the present invention forms the air gap 16 and 36 of a gap length longer than that is calculated by these theoretic equations. As described above, the turn densities near the air gap 16 and 36 are set to least or zero. As a consequence, the transformer 100 may prevent not only the breakdown of the transistor Q due to the magnetic saturation but also the temperature breakdown in the winding 20 or 40.

Further, the present invention is not limited to these preferred embodiments, but various variations and modifications may be made without departing from the scope of the present invention. For example, it is understood that the switching regulator of the present invention is applicable to a separately excited (oscillated) type as well as self-excited (self-oscillated) type. It is understood that a core shape is not limited to an EE type and an EI type, but any type (such as EER, QK, PQ, etc.) known in the art. Similarly, this is true to a bobbin shape and any other component shape.

The present invention provides a transformer structure and a switching regulator that prevent the winding from breaking down due to the heat caused by the leakage magnetic field. The present invention also may provide a switching regulator that prevents a breakdown of a switch caused by the magnetic saturation by properly setting an air gap length.

What is claimed is:

1. A transformer comprising:
    a core having an air gap; and
    a winding wound around said core, a turn density of said winding being made least on the air gap.
2. A transformer according to claim 1, wherein the turn density on the air gap is zero.
3. A transformer according to claim 1, wherein said core includes:
    a first core member; and
    a second core member coupled to said first core member, and wherein
    said transformer further comprises a spacer as an insulator between said first and second core members.
4. A core for use with a transformer, said core comprising:
    a first core member; and
    a second core member coupled to said first core member, an air gap formed between said first and second member being offset from a center of said core,
    wherein said fist and second core members have respectively a sectionally E shape, and said core is an EE core.
5. A switching regulator comprising:
    a switch;
    a transformer, connected to said switch, which comprises a core having an air gap, and a winding wound around said core, a turn density of said winding being made least on the air gap; and
    a rectifier connected to said transformer.
6. A switching regulator according to claim 5, wherein the turn density on the air gap is zero.
7. A switching regulator according to claim 5, wherein said rectifier turns off while said switch turns on.
8. A switching regulator according to claim 5, wherein said transformer includes a core which comprises a first core member, and a second core member coupled to said first core member, an air gap formed between said first and second core member being offset from a center of said core.
9. A transformer manufacturing method comprising the steps of:
    forming a core having an air gap by connecting first and second core member to each other;
    connecting said core to a bobbin; and
    forming a winding on said bobbin so that a turn density becomes least on the air gap.

* * * * *